United States Patent
Downs

[15] 3,671,999
[45] June 27, 1972

[54] APPARATUS FOR RECOVERING MEAT FROM BONES

[72] Inventor: Frank R. Downs, Estherville, Iowa
[73] Assignee: Francis L. Downs, Esterville, Iowa
[22] Filed: July 14, 1970
[21] Appl. No.: 54,674

[52] U.S. Cl. .................................................17/1 G, 17/11
[51] Int. Cl. ......................................................A22c 17/04
[58] Field of Search........................................17/1 G, 46, 11

[56] References Cited

UNITED STATES PATENTS

| | | | |
|---|---|---|---|
| 2,851,362 | 9/1958 | Goldberg | 17/1 G X |
| 3,089,775 | 5/1963 | Lindall | 17/1 G X |
| 3,570,050 | 3/1971 | Draper et al. | 17/1 G |

FOREIGN PATENTS OR APPLICATIONS 561,246  10/1932  Germany....................17/1 G

*Primary Examiner*—Lucie H. Laudenslager
*Attorney*—Robert U. Geib, Jr.

[57] ABSTRACT

A horizontally disposed chain wire-link endless belt conveyor receives the poultry pieces to be treated and moves the same beneath a flexible imperforate hold-down endless belt conveyor and while the pieces being treated are still on the chain wire-link endless belt conveyor directing thereonto water-jets under suitable pressure from above; the meat separating from the bones and falling downwardly through the chain wire-link conveyor for collection and the separated bones moving over the end of the chain wire-link endless belt conveyor for disposal.

6 Claims, 9 Drawing Figures

INVENTOR
FRANK R. DOWNS

BY ROBERT U. GEIB, JR.
ATTORNEY

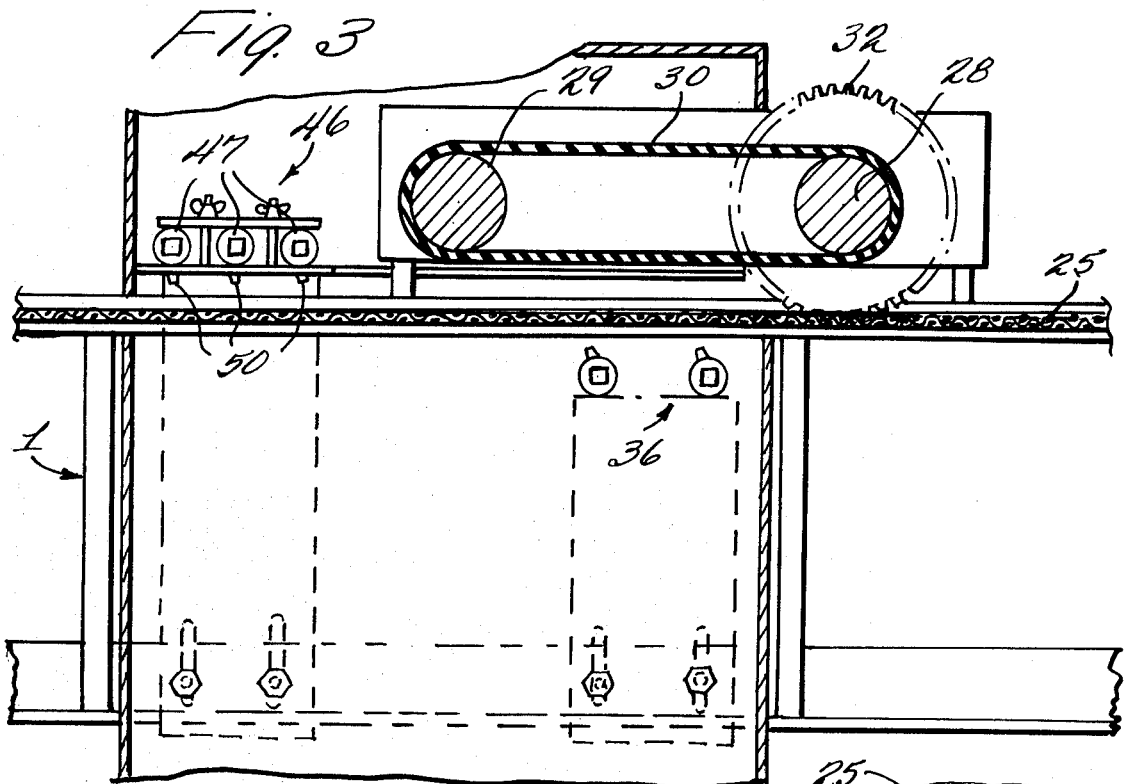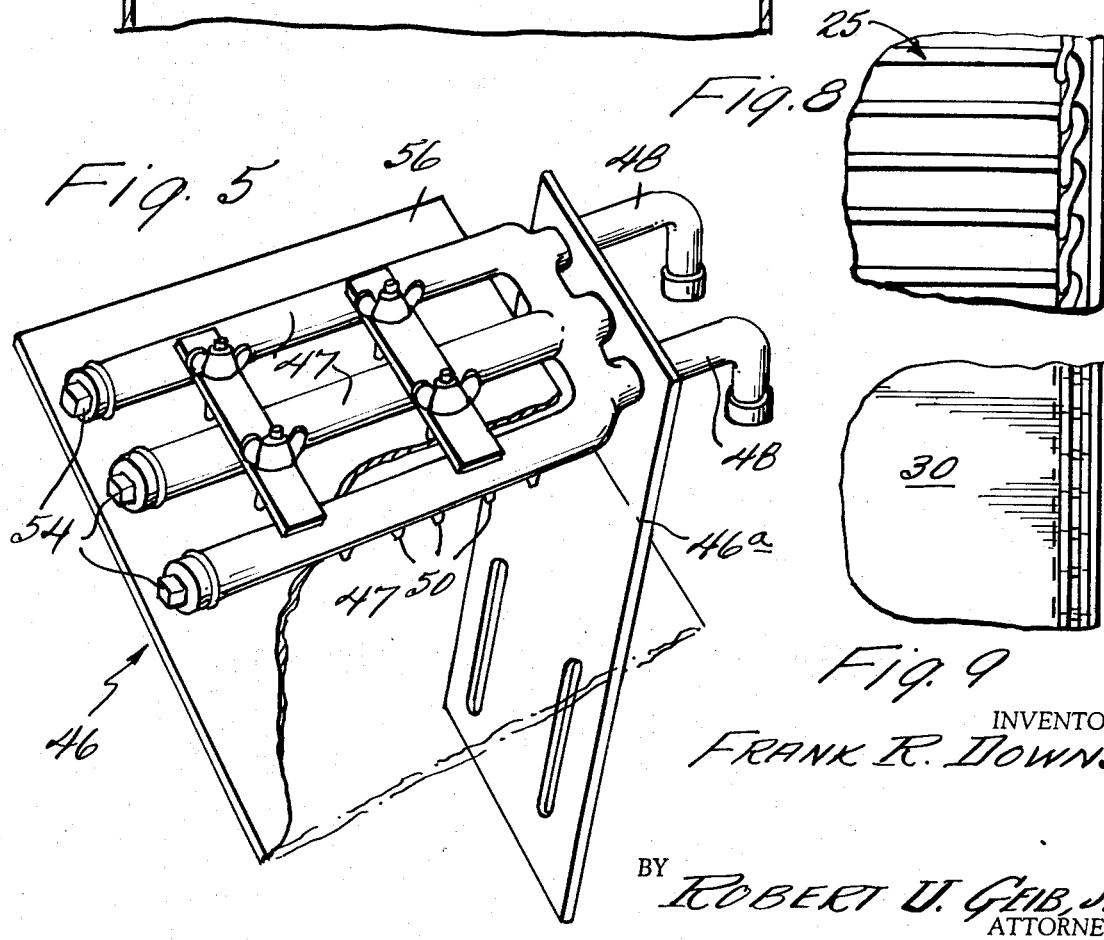

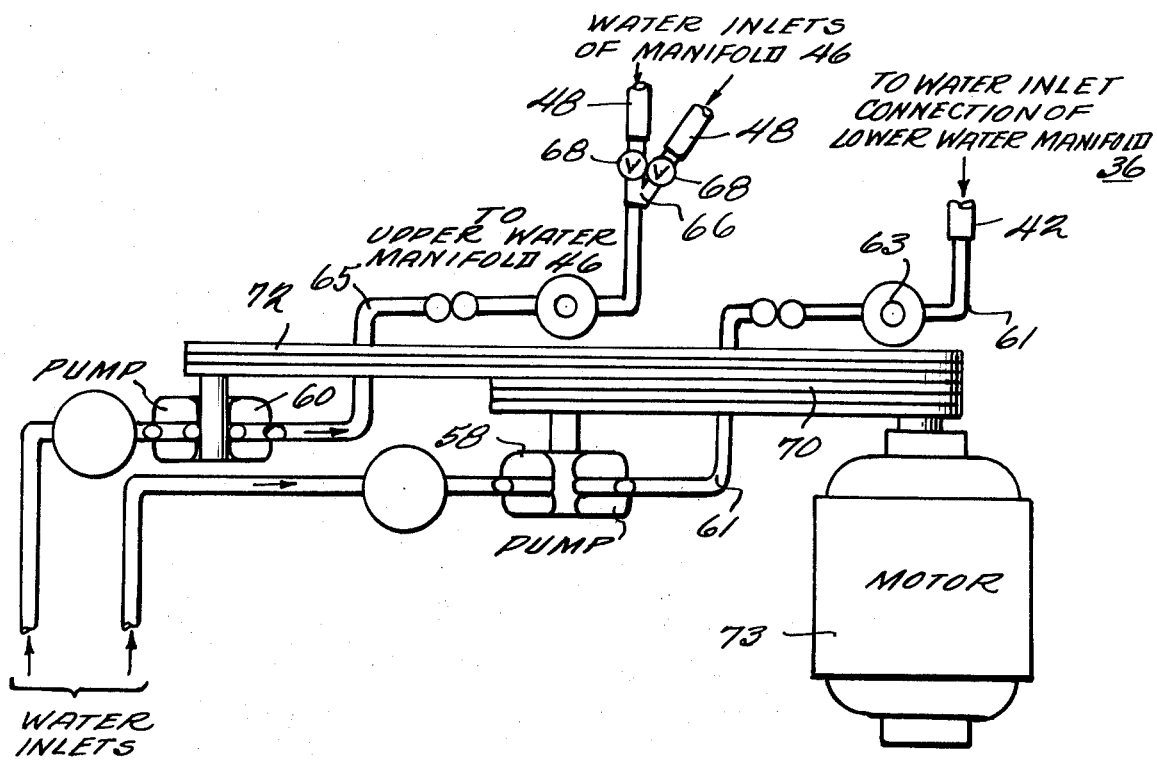
Fig. 4
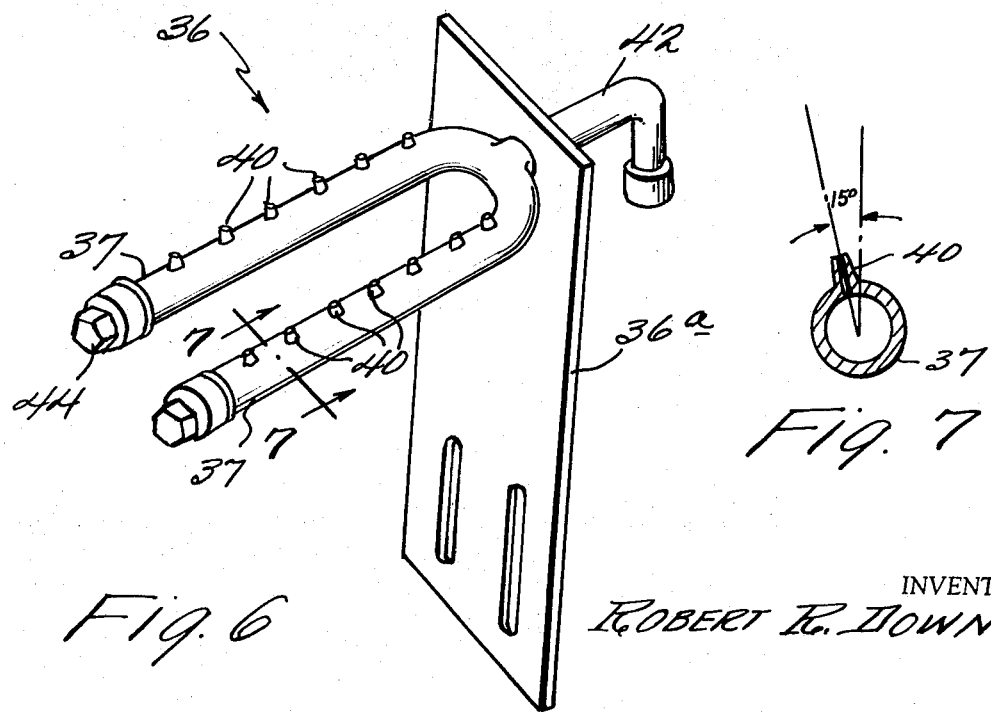
Fig. 6
Fig. 7
INVENTOR
ROBERT R. DOWNS
BY ROBERT U. GEIB, JR.
ATTORNEY

APPARATUS FOR RECOVERING MEAT FROM BONES

This invention relates to the removal of meat from bone, and more particularly to the removal of meat from certain portions which are ordinarily difficult to separate, such as chicken wings and backs, chicken necks and rib cages, turkey necks, etc., although not limited thereto.

It is among the objects of the invention to provide a machine for very effectively boning what are usually the most difficult portions of poultry which is durable and relatively easy and inexpensive to manufacture, install, operate and maintain.

The foregoing and other objects and advantages will become more apparent after referring to the following specification and annexed drawings, wherein like reference numerals designate like parts, and wherein:

FIG. 3 is an enlarged sectional elevational view taken on the lines 3—3 of FIG. 2;

FIG. 4 is a schematic view illustrating the water supply system for the water jets which are used in the apparatus;

FIG. 5 is a fragmentary perspective view illustrating the upper and downwardly directed spray nozzles;

FIG. 6 is a perspective view of the lower and upwardly directed spray nozzles;

FIG. 7 is a sectional view taken on the line 7—7 of FIG. 6;

Figure 1:
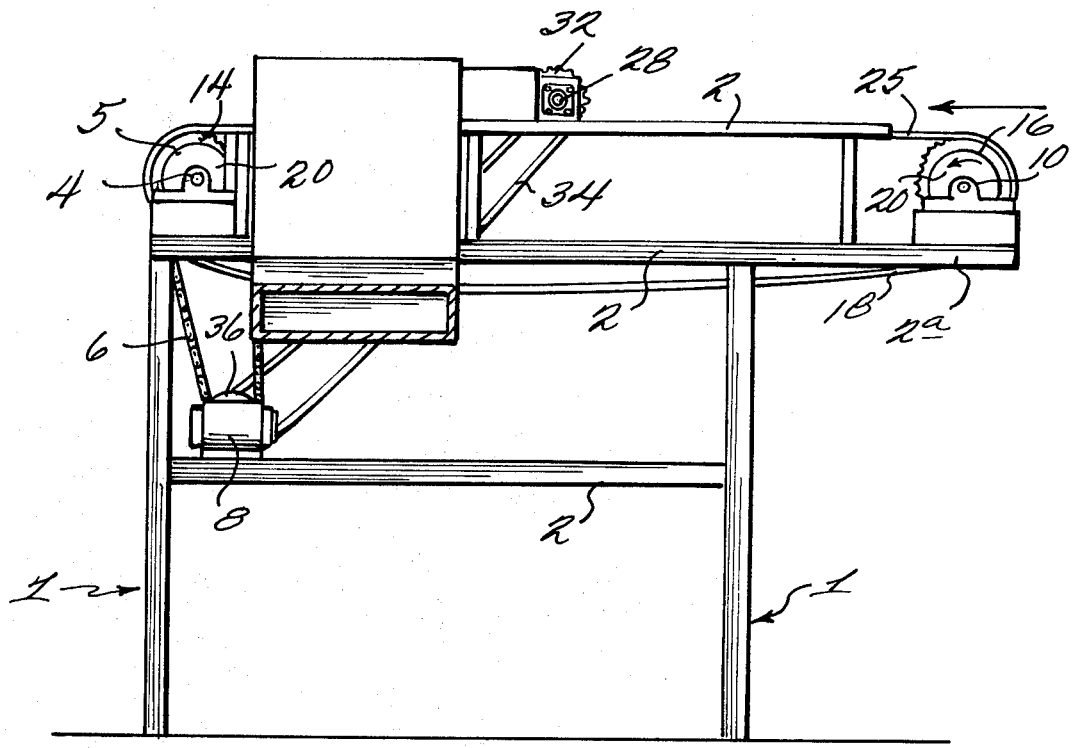
FIG. 1 is a side elevational view, partly in section, which generally illustrates an apparatus which has been constructed in accordance with the teachings of the present invention.

FIG. 8 is a fragmentary plan view of an edge portion of the chain wire-link endless belt conveyor which carries the poultry pieces to be deboned; the same comprising three distinctly different mesh sizes as referred to hereinafter; and FIG. 9 is a fragmentary plan view of an edge portion of an endless belt of rubber or other suitable material which holds the poultry pieces to be deboned against the chain wire-link endless belt conveyor.

Referring more particularly to the drawings, the numerals 1 and 2 respectively designate vertical and horizontal structural shapes which are assembled to form the generally rectangular frame of the apparatus of the invention.

Atop the upper most horizontal structural member 2, and adjacent one end thereof, is a suitably journaled rotatable shaft 4 having a gear 5 secured thereto, the same being driven through a chain 6 by a smaller gear which is secured to the drive shaft of an adjustable speed electric motor 8.

The opposite end of the uppermost horizontal structural member 2 is provided with a suitably braced outboard extension 2a, atop which there is a suitably journaled rotatable shaft 10.

The rotatable shaft 4 carries a chain-sprocket 14 and a similar chain-sprocket 16 is carried by the rotatable shaft 10; and these sprockets 14 and 16 are connected by a driving chain 18.

Mounted on and secured to, each of the rotatable shafts 4 and 10 is a cylinder 20 which is suitably surfaced to support and impart driving movement to a chain wire-link endless belt conveyor 25.

Alternatively, chain-sprockets 14 and 16 may be provided at both ends of their respective supporting shafts 4 and 10 and at both ends of their respective supporting shafts 4 and 10 and utilized to cooperate with a chain wire-link endless belt conveyor of the well-known type which is provided with a sprocket chain on each of its edges.

In any event, the chain wire-link endless belt conveyor 25 is adapted to move in the direction of the arrow and carry with it the pieces of poultry which are to be boned.

With respect to the chain wire-link endless belt 25, the teachings of the invention contemplate ⅜-inch aperture size for processing chicken wings and backs; ¼-inch aperture size for processing chicken necks and rib cages; and ½-inch aperture size for processing turkey necks. The purpose of these different sizes is to assure the retention on the top of the endless belt conveyor of the bone and still permit the meat which has been separated therefrom to be forced downwardly through the endless belt conveyor, for collection, in a manner to be later described.

Figure 2:
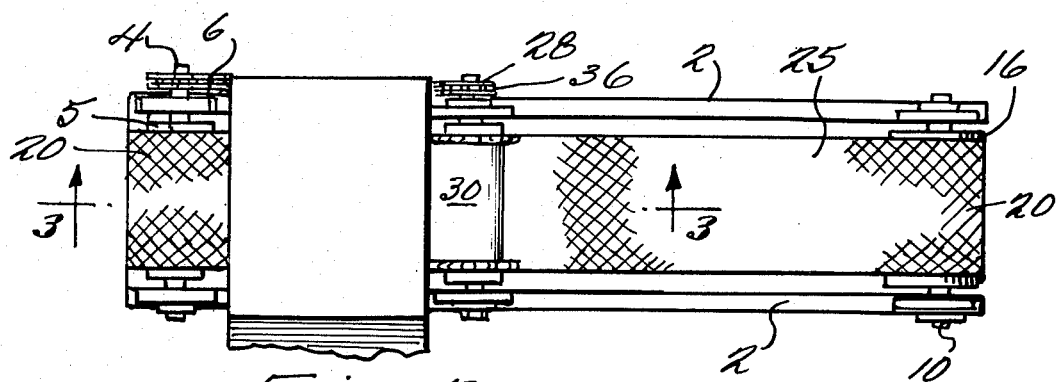
FIG. 2 is a fragmentary plan view of a portion of the apparatus of FIG. 1.

As shown in FIG. 3, disposed above, and intermediate the ends of the chain wire-link endless belt conveyor 25 is a pair of transversely extending, spaced, parallel rotatable shafts 28 and 29 which, between them, support an endless belt 30 of rubber or other suitable flexible material. The right-hand rotatable shaft 28, as viewed in FIG. 2, carries a sprocket 32 which may, if desired, be driven through the chain wire-link endless belt conveyor 25 which is drivingly associated with the adjustable speed electric motor 8, and which in turn keeps both the chain wire-link endless belt 25 and the endless belt 30 of rubber or the like moving at the same speed.

Disposed immediately below that portion of the chain wire-link endless belt conveyor 25 which underlies the flexible and imperforate upper endless belt 30 is a substantially U-shaped transversely extending manifold 36 which is provided on the upper surfaces of its straight or leg members 37 with a series of upwardly directed removable spray nozzles 40 which are spaced approximately 1 inch apart. The center of that portion of the substantially U-shaped manifold 36 which connects the straight or leg portions 37 is provided with a water-inlet connection 42, and the outer ends of said straight or leg members are fitted with caps 44 which are movable to facilitate flushing whenever desirable.

Disposed immediately above that portion of the chain wire-link endless belt conveyor 25 which extends beyond the flexible and imperforate endless suppression belt 30 is a second transversely extending manifold 46 which comprises three straight parallel evenly spaced leg members 47 and a pair of spaced parallel water-inlet connections 48 each of which is spaced slightly inwardly of what would otherwise be full alignment with one of the outer straight or leg members 47. This second, and upper, transversely extending manifold 46 is provided with a series of downwardly directed removable spray nozzles 50 which are spaced approximately 1 inch apart; and the outer ends of its three straight or leg members are fitted with removable caps 54.

The transversely extending manifolds 36 and 46 are attached to the frame of the machine 1-2 by suitable vertically adjustable plates 36a and 46a, respectively.

The upper transversely extending manifold 46 is also provided with a removable deflection shield 56, the purpose of which will be later described.

Disposed on the frame 1-2 and beneath the horizontally-extending chain wire-link endless belt conveyor 25 is a pair of suitably supplied water pumps 58 and 60, the outlet of the water pump 58 being connected to the water inlet connection 42 of the lower and substantially U-shaped manifold 36 through a conduit 61 having a shut-off valve 63; and the outlet of the water pump 60 is connected to the pair of water inlet connections 48 of the upper transversely extending manifold 46 through a conduit 65 which is provided with a flow-divider 66 having a valve 68 in each of the arms thereof.

The water pumps 58 and 60 are driven through endless belts 70 and 72, respectively, which may in turn be driven by a separate variable speed electric motor 73 which is mounted on the frame 1-2 or, if desired, by a suitable connection with the previously mentioned variable speed electric motor 8 which drives the horizontally-extending chain wire-link endless belt conveyor 25.

In either event, it is desired that the pressure of the water emitted from the removable spray nozzles 40 and 50 of the lower and upper water manifolds 36 and 46, respectively, be between 500 and 1,000 pounds per square inch, depending upon the extent to which the pieces of poultry have been cooked. For these purposes it has been found satisfactory to utilize water-pumps 58 and 60 having a capacity of 25 gallons per minute.

As stated earlier, the invention contemplates the utilization of chain wire-link endless belt conveyors 25 of three distinctly different mesh sizes, i.e., one-fourth inch (for chicken necks and rib cages) three-eighths inch (for chicken wings and backs) and one-half inch (for turkey necks). The purpose of this interchangeability being to retain the bones on the top of the upper flight, or "run," of the chain wire-link endless belt with the maximum amount of separated meat being forced through the interstices thereof by the downwardly directed high-pressure sprays from the spray nozzles 50 after the preliminary deboning operation wherein the piece of poultry being worked upon is between the upwardly directed spray nozzles 40 and the flexible and imperforate endless suppression belt 30.

Where there is adequate volume three separate machines may be set up to utilize the three aforementioned mesh-sizes of chain wire-link endless belt 25. Otherwise, one machine may be used; with the mountings for the rotatable shafts 4 and 10 constructed and arranged to permit easy and rapid substitution of the chain wire-link endless belt 25.

In addition to the modification in the mesh size of the chain wire-link endless belt conveyor 25 the invention contemplates other variations in the operating elements, for example in the deboning of poultry necks it will sometimes prove very effective to have the valve 63 in the water inlet conduit 42 to the lower manifold 36 open and one of the valves 68 in the flow divider 66 to the dual water-inlet connections 48 of the upper manifold 36 closed and in the deboning of poultry wings beneficial results may sometimes be obtained by closing the valve 63 to entirely discontinue the operation of the lower manifold 36 while in other instances it might be desirable to connect both conduits 61 and 65 to the upper manifold 46 through suitable connections (not shown).

In this connection it should be mentioned that the removable deflection shield 56 on the upper manifold 46 is primarily for use when deboning poultry wings. Also, that the flexible and imperforate endless suppression belt is primarily used when deboning chicken necks.

Another important operational feature is the adjustment of the pattern established by the two parallel rows of lower spray nozzles 40 and the three parallel rows of upper spray nozzles 50 so as not to overlap and interfere with each other. It is desirable to have their pattern adjusted approximately 15° to approximately 30° with respect to the horizontal.

On both upper and lower manifolds 36 and 46, it is desirable to have their spray nozzles 40 and 50 respectively set at 90° with respect to the vertical, either forwardly or rearwardly of the direction of movement of the poultry pieces being treated.

Having thus described the invention what I claim as new and desire to secure by Letters Patent is:

1. Apparatus for recovering meat from bones comprising, in combination, a substantially horizontally disposed foraminous endless conveyor belt having upper and lower flights a water manifold disposed below the upper flight of said endless conveyor belt and extending transversely thereunder a manifold disposed above the upper flight of said endless conveyor belt and in parallelism with, but vertically offset with respect to, said first-named manifold a row of spray nozzles carried by and communicating with said first-named manifold and directed upwardly onto said endless conveyor belt and a row of spray nozzles carried by and communicating with said second-named manifold and directed downwardly onto said endless conveyor belt.

2. The apparatus of claim 1, together with a flexible and imperforate endless belt disposed above and in substantial parallelism with that portion of the upper flight of said endless conveyor belt which is above said first-named manifold; said flexible and imperforate endless belt being adapted to contact pieces of meat and bone which are being carried along on the upper flight of said endless conveyor belt.

3. The apparatus of claim 2 wherein the chain wire-link endless conveyor belt provides a mesh size of between approximately one-fourth inch and approximately one-half inch.

4. The apparatus of claim 1 wherein the manifolds and spray nozzles are constructed and arranged to deliver water under a pressure of between approximately 500 pounds and approximately 1,000 pounds per square inch.

5. The apparatus of claim 1 wherein a deflection plate is secured to the upper portion of the second-named manifold and extends transversely with respect thereto.

6. The apparatus of claim 1 wherein the chain wire-link endless conveyor belt provides a mesh size of between approximately one-fourth inch and approximately one-half inch.

* * * * *